(12) United States Patent
Gopal et al.

(10) Patent No.: US 11,320,990 B2
(45) Date of Patent: May 3, 2022

(54) NVDIMM SERIAL INTERFACE FOR OUT-OF-BAND MANAGEMENT BY A BASEBOARD MANAGEMENT CONTROLLER AND METHOD THEREFOR

(71) Applicant: DELL PRODUCTS, LP, Round Rock, TX (US)

(72) Inventors: Janardan Rajagopal Pradeep Gopal, Round Rock, TX (US); Adolpho S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 16/422,060

(22) Filed: May 24, 2019

(65) Prior Publication Data

US 2020/0371695 A1  Nov. 26, 2020

(51) Int. Cl.
  *G06F 3/06* (2006.01)
  *G06F 13/42* (2006.01)
  *G06F 21/57* (2013.01)

(52) U.S. Cl.
  CPC .......... *G06F 3/0619* (2013.01); *G06F 3/0658* (2013.01); *G06F 3/0679* (2013.01); *G06F 13/4282* (2013.01); *G06F 21/572* (2013.01)

(58) Field of Classification Search
  CPC .... G06F 3/0619; G06F 3/0658; G06F 3/0679; G06F 13/4282; G06F 21/572
  See application file for complete search history.

(56) References Cited

U.S. PATENT DOCUMENTS

| | | | |
|---|---|---|---|
| 10,229,018 B2 | 3/2019 | Sankaranarayanan et al. | |
| 2014/0047224 A1* | 2/2014 | Ayanam | G06F 8/654 713/1 |
| 2014/0181364 A1* | 6/2014 | Berke | G06F 13/16 711/103 |
| 2014/0208133 A1 | 7/2014 | Gopal et al. | |
| 2014/0365755 A1* | 12/2014 | Liu | G06F 21/572 713/2 |
| 2016/0217283 A1* | 7/2016 | Liu | G06F 21/566 |
| 2016/0328300 A1* | 11/2016 | Rahardjo | G06F 11/1417 |
| 2017/0040057 A1* | 2/2017 | Cho | G06F 13/16 |
| 2017/0085383 A1* | 3/2017 | Rao | G06F 3/0632 |
| 2017/0235682 A1 | 8/2017 | Masuyama et al. | |
| 2019/0012101 A1 | 1/2019 | Jenne | |

* cited by examiner

*Primary Examiner* — Getente A Yimer
(74) *Attorney, Agent, or Firm* — Larson Newman, LLP

(57) ABSTRACT

A method includes providing a first serial communication interface at a non-volatile dual-inline memory module at an information handling system. A second serial communication interface is provided at a baseboard management controller at the information handling system. The method further includes providing a serial bus coupling the first communication interface and the second communication interface, the serial bus providing side-band and out-of-band data transfer of information between a non-volatile memory device included at the non-volatile dual-inline memory module and the baseboard management controller.

20 Claims, 4 Drawing Sheets

NVDIMM SERIAL INTERFACE FOR OUT-OF-BAND MANAGEMENT BY A BASEBOARD MANAGEMENT CONTROLLER AND METHOD THEREFOR

FIELD OF THE DISCLOSURE

This disclosure generally relates to information handling systems, and more particularly relates to an NVDIMM serial interface for out-of-band management by a baseboard management controller.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. A unified extensible firmware interface (UEFI) can provide an interface between the hardware and firmware of the information handling system and an operating environment of the information handling system.

SUMMARY

A method may include providing a first serial communication interface at a non-volatile dual-inline memory module at an information handling system. A second serial communication interface is provided at a baseboard management controller at the information handling system. The method further includes providing a serial bus coupling the first communication interface and the second communication interface, the serial bus providing side-band and out-of-band data transfer of information between a non-volatile memory device included at the non-volatile dual-inline memory module and the baseboard management controller.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

An information handling system typically includes synchronous dynamic random access memory (SDRAM) devices to store program instructions and data. SDRAM is typically provided in a form factor known as a dual in-line memory module (DIMM). Recently, a variant of the DIMM device has become popular that includes non-volatile memory devices, known as a non-volatile dual in-line memory module (NVDIMM). NVDIMM devices are available in a growing number of variations including the popular NVDIMM-N, which includes both SDRAM devices and non-volatile memory devices. NVDIMM devices are said to provide persistent memory because the information can be maintained at the devices after supply power is removed. For example, a common implementation is to include a back-up power source, such as a battery or super-capacitor. If primary power at an information handling system is interrupted, the back-up power sources can be used to copy information from the volatile SDRAM devices into the non-volatile memory devices included at the NVDIMM. When power is restored to the system, the information stored at the non-volatile memory devices can be copied back to the SDRAM devices.

An NVDIMM device typically includes a high-speed interface for storing and retrieving information from the NVDIMM. This high-speed interface is typically compliant with one of several double data rate (DDR) variants, such as DDR4, DDR-T, and the like. In addition, an NVDIMM can include a low speed serial interface, such as a variant of the I2C bus protocol known as a system management bus (SMB). The low speed interface is used to configure operation of the NVDIMM, including access of Serial Presence Detect (SPD) information. As disclosed herein, an additional high-speed serial interface is provided at the NVDIMM that is configured to provide side-band and out-of-band access to the non-volatile memory devices included at the NVDIMM by a baseboard management controller.

Figure 1:
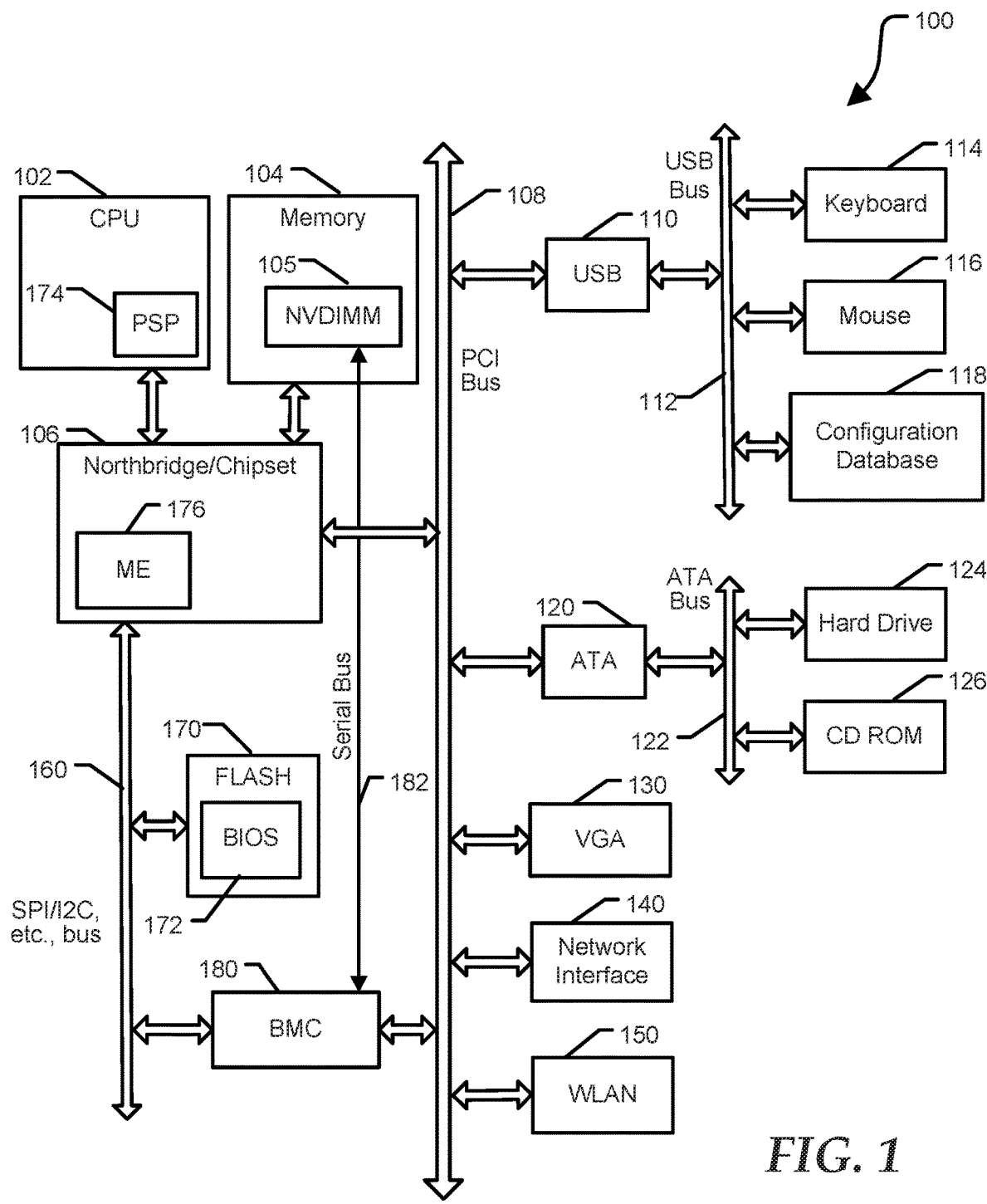
FIG. 1 is a block diagram of an information handling system according to an embodiment of the present disclosure.

FIG. 1 illustrates an information handling system 100 including a processor 102, a memory 104, a chipset 106, a PCI bus 108, a universal serial bus (USB) controller 110, a USB 112, a keyboard device controller 114, a mouse device controller 116, a configuration database 118, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a first flash memory device 170 for storing BIOS code 172, and a baseboard management controller (BMC) 180. In an embodiment, memory 104 includes an NVDIMM 105. NVDIMM 105 is coupled to BMC 180 by a high-speed serial bus 182.

BMC 190 can be referred to as a service processor, and embedded controller (EC), and the like. The terms BMC and EC are interchangeable with regard to the present disclosure. Flash memory device 170 can be referred to as a SPI flash device, BIOS SPI, and the like. BMC 190 is configured to provide out-of-band and/or side-band access to devices at information handling system 100. As used herein, out-of-band access herein refers to operations performed without support of CPU 102, such as prior to execution of BIOS code 171 by processor 102 to initialize operation of system 100. Side-band access refers to operations that are performed independently from operation of CPU 102.

In an embodiment, system 100 can further include a platform security processor (PSP) 174 and/or a management engine (ME) 176. In particular, an x86 processor provided by Advanced Micro Devices (AMD) can include PSP 174, while ME 176 is typically associated with systems based on Intel x86 processors, and can be included at chipset 106. PSP 174 and ME 176 are processors that can operate independently of core processors at CPU 102, and that can execute firmware prior to the execution of the BIOS by a primary CPU core processor. PSP 174, included in recent AMD based systems, is a microcontroller that includes dedicated read-only memory (ROM) and static random access memory (SRAM). PSP 174 is an isolated processor that runs independently from the main CPU processor cores. PSP 174 has access to firmware stored at flash memory device 170. During the earliest stages of initialization of system 100, PSP 174 is configured to authenticate the first block of BIOS code stored at flash memory device 170 before releasing the x86 processor from reset.

Common to most firmware and system initialization architectures is the concept of root of trust. At a most general level, the root of trust relates to software processes and/or hardware devices that ensure that firmware and other software necessary for operation of an information handling system is operating as expected. Accordingly, PSP 174 provides a hardware root of trust for system 100. ME 176 provides similar functionality in Intel-based systems. The important aspect for a root of trust is to be sure that the initial code is what the manufacturer intended, before the code is executed. When the information handling system starts, the root of trust can execute self-tests to validate the first piece of code in the chain of trust. At the present time, PSP 174 is integrated at the central processing unit, while ME 176 is integrated at a chipset device. The PSP and the ME are both configured to validate initial firmware at a BIOS image, herein referred to as an initial boot block. Each of these architectures poses unique security considerations. Furthermore, original equipment manufacturers (OEMs) may have difficulty integrating proprietary functionality within the confines of these divergent initialization architectures. In an embodiment, BMC 180 can be configured to provide a root of trust and provide greater flexibility to the OEM to implement proprietary security and system functionality. In particular, the BMC can be configured to validate the initial boot block, and optionally other BIOS and system firmware, for example at the beginning of the BIOS initialization process.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of chipset 106 can be integrated within CPU 102. In an embodiment, chipset 106 can include a platform controller hub (PCH). System 100 can include additional buses and bus protocols, for example I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS code 171 can be referred to as a firmware image, and the term BIOS is herein used interchangeably with the term firmware image, or simply firmware. BIOS code 171 includes instructions executable by CPU 102 and PSP 174 to initialize and test the hardware components of system 100, and to load a boot loader or an operating system (OS) from a mass storage device. BIOS code 171 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS code 171 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

Figure 2:
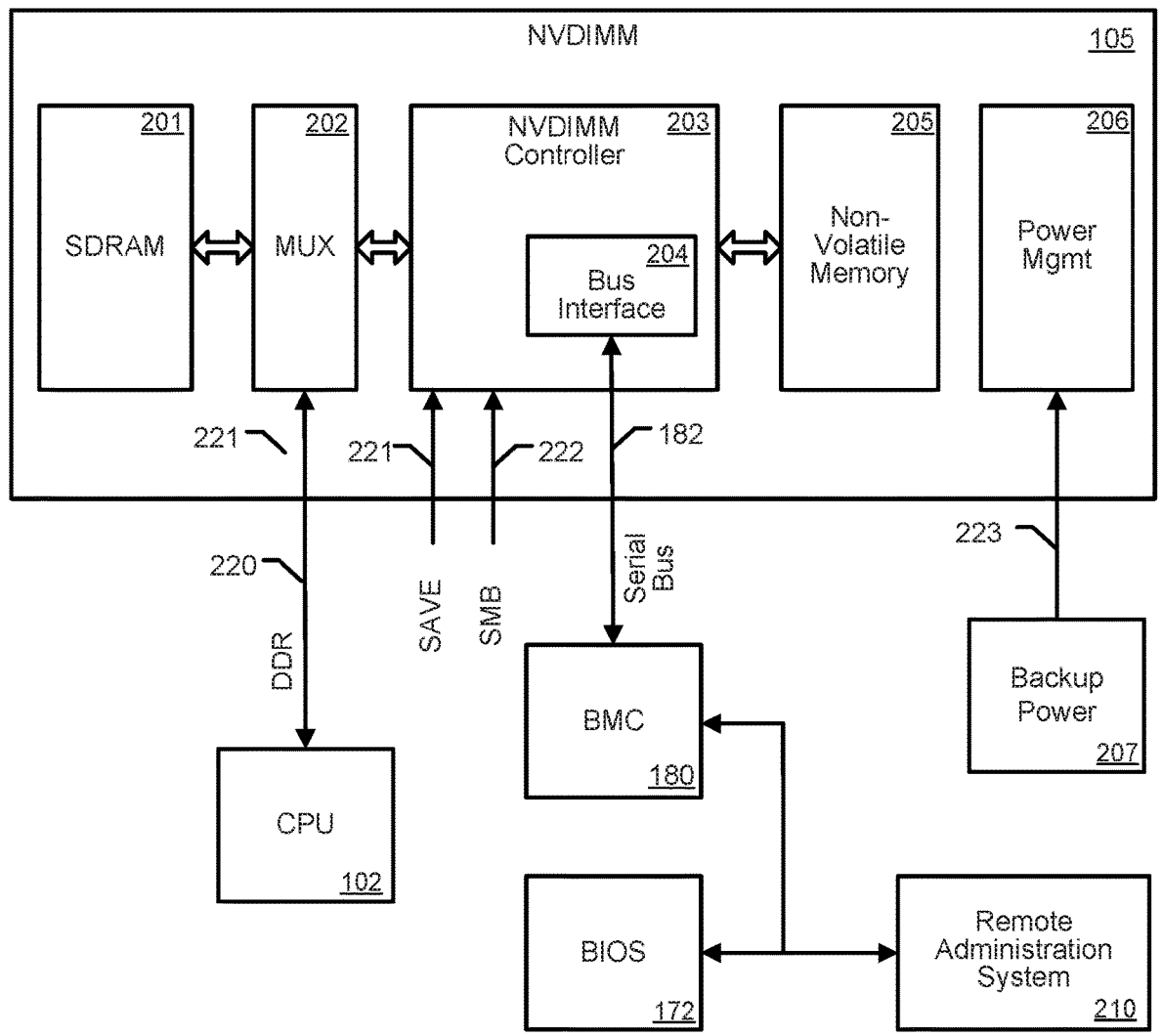
FIG. 2 is a block diagram illustrating a portion of the information handling system of FIG. 1 according to a specific embodiment of the present disclosure.

FIG. 2 shows a portion of information handling system 100 according to a specific embodiment of the present disclosure. FIG. 2 illustrates NVDIMM 105, CPU 102, BMC 180, BIOS 172, a backup power source 207, and a remote administration system 210. NVDIMM includes SDRAM 201, a multiplexor 202, an NVDIMM controller 203 including a bus interface 204, non-volatile memory 205, and power management 206. NVDIMM 105 further includes a DDR interface 220, an input to receive a SAVE control 221, a system management bus (SMB) interface 222, and an input 223 for receiving power from backup power source 207. Bus interface 204 can provides high-speed serial communication between non-volatile memory 205 and BMC 180 via serial bus 182. NVDIMM 105 can include additional inputs, outputs, or bidirectional terminals, not shown for clarity. NVDIMM 105 is intended to represent any current or future variety of NVDIMM device, and can include other components and different interconnect topologies. However, according to the presently disclosed embodiments, NVDIMM 105 will include bus interface 204 and non-volatile memory 205. While bus interface 204 is shown to be included at NVDIMM controller 203, bus interface 204 can be a discreet device external to controller 203, or it can be integrated with another component.

During operation, BMC 180 can utilize high-speed serial bus 182 to access non-volatile memory 205 for a variety of purposes, such as applications described below with reference to FIGS. 3-5. In an embodiment, BMC can use serial bus 182 to store and/or retrieve information at non-volatile memory 205, independent of whether CPU 102 is presently using the DDR interface 220 to access SDRAM 201, and independently of whether CPU 102 is even initialized and operational. NVDIMM controller 203, or another device included at NVDIMM 105 can manage accesses initiated over bus 182, including latching and multiplexing of address and data, and the like. In addition, controller 203 is configured to perform traditional activities at NVDIMM 105, such as copying of data from SDRAM 201 to non-volatile memory 205 in response to assertion of the SAVE control 221, and configuration operations performed via SMB 122. In an embodiment, remote administration system 210 can initiate installation of system firmware and/or data at non-volatile memory 205 via BMC 180 and serial bus 182. In another embodiment, BIOS 172 can initiate access to non-volatile memory 205 via BMC 180 and serial bus 182. For example, during initialization of information handling system 100, BIOS 172 can use mailbox protocols to communicate with BMC 180, for example to store or retrieve drivers, variables, and the like.

High-speed serial bus 182 can utilize any suitable standard or proprietary bus protocol, such as SPI, controller area network (CAN), I3C, and the like. While the SMB interface typically operates at a frequency of one megahertz or less, it is desirable for serial bus 182 to operate at a frequency greater than 10 MHz, for example 30 MHz, 60 MHz, 120 MHz, or greater. In an embodiment, serial bus 182 can include more than one channel, for example similar to dual-SPI, Quad SPI, and the like. Accordingly, data rates of sixty mega-Bytes per second or greater can be provided by bus 182.

In an embodiment, BMC 180 is configured to provide security and authentication functionality. For example, BMC 180 can verify that data or firmware passes cryptographic validation before storing the information at non-volatile memory 205. In a specific embodiment, a portion of non-volatile memory 205 that is available for access by BMC 182 can be configured as writable only by BMC 182, so that no other device or software process can modify the information stored at these locations. In one embodiment, information stored at non-volatile memory 205 can only be accessed by BMC 182, while in another embodiment; information stored at non-volatile memory 205 by BMC 182 can be retrieved via DDR interface 220. One of skill will appreciate that read and write access privileges at non-volatile memory 205 can be configured to provide a desired degree of access control. However, limiting write access exclusively to BMC 180 can provide security advantages, especially if BMC 180 provides a hardware level root-of-trust.

Figure 3:
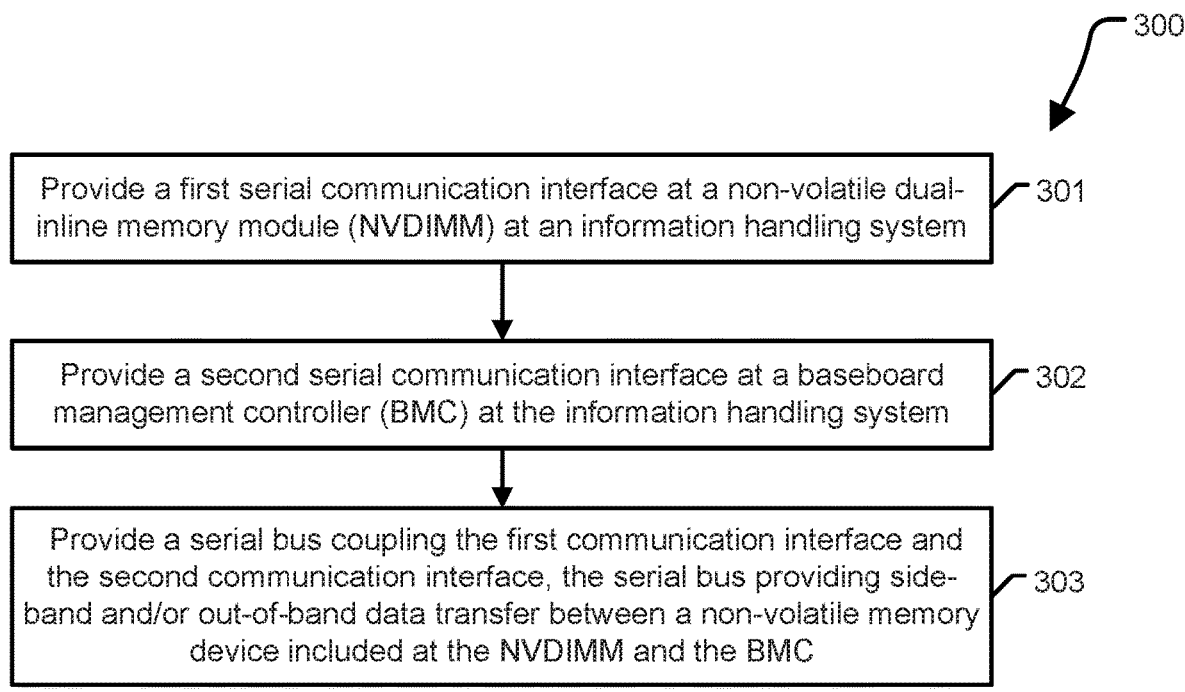
FIG. 3 is a flow diagram illustrating a method for accessing non-volatile memory at a non-volatile dual in-line memory module by a baseboard management controller according to a specific embodiment of the present disclosure.

FIG. 3 shows a method 300 for accessing non-volatile memory at an NVDIMM by a BMC according to a specific embodiment of the present disclosure. Method 300 begins at block 301 where a first serial communication interface is provided at NVDIMM at an information handling system. For example, bus interface 204 and NVDIMM controller 203 are configured to store and retrieve information at non-volatile memory 205. At block 302, a second serial communication interface is provided at a BMC at the information handling system. At block 303, a serial bus coupling the first communication interface and the second communication interface is provided, the serial bus providing side-band and/or out-of-band data transfer between a non-volatile memory device included at the NVDIMM and the BMC. For example, serial bus 182 of FIG. 2 supports high-speed transfer of instructions and data between BMC 180 and NVDIMM 105.

Figure 4:
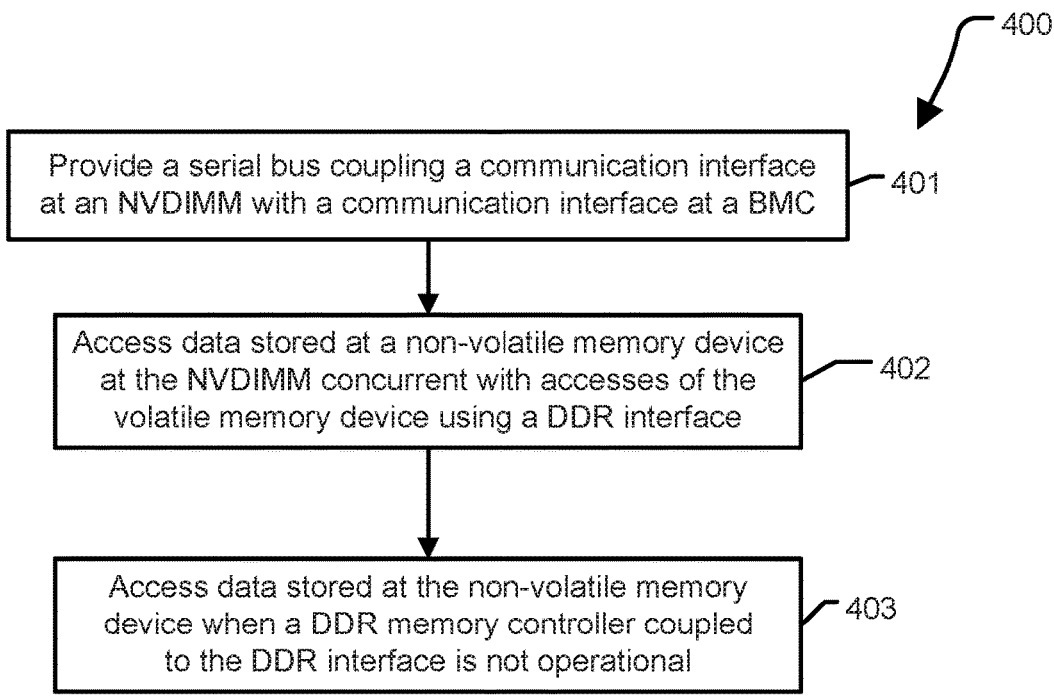
FIG. 4 is a flow diagram illustrating a method for accessing non-volatile memory at a non-volatile dual in-line memory module by a baseboard management controller according to another embodiment of the present disclosure.

FIG. 4 shows a method 400 for accessing non-volatile memory at an NVDIMM by a BMC according to another embodiment of the present disclosure. Method 400 begins at block 401 where a serial bus coupling a communication interface at an NVDIMM with a communication interface at a BMC is provided, for example, serial bus 182. At block 402, data stored at a non-volatile memory device at the NVDIMM is accessed independently from accesses of the volatile memory device at the NVDIMM using a DDR interface, referred to herein as side-band communication. At block 403, data stored at the non-volatile memory device is accessed when a DDR memory controller coupled to the DDR interface is not operational, herein referred to as out-of-band communication.

Figure 5:
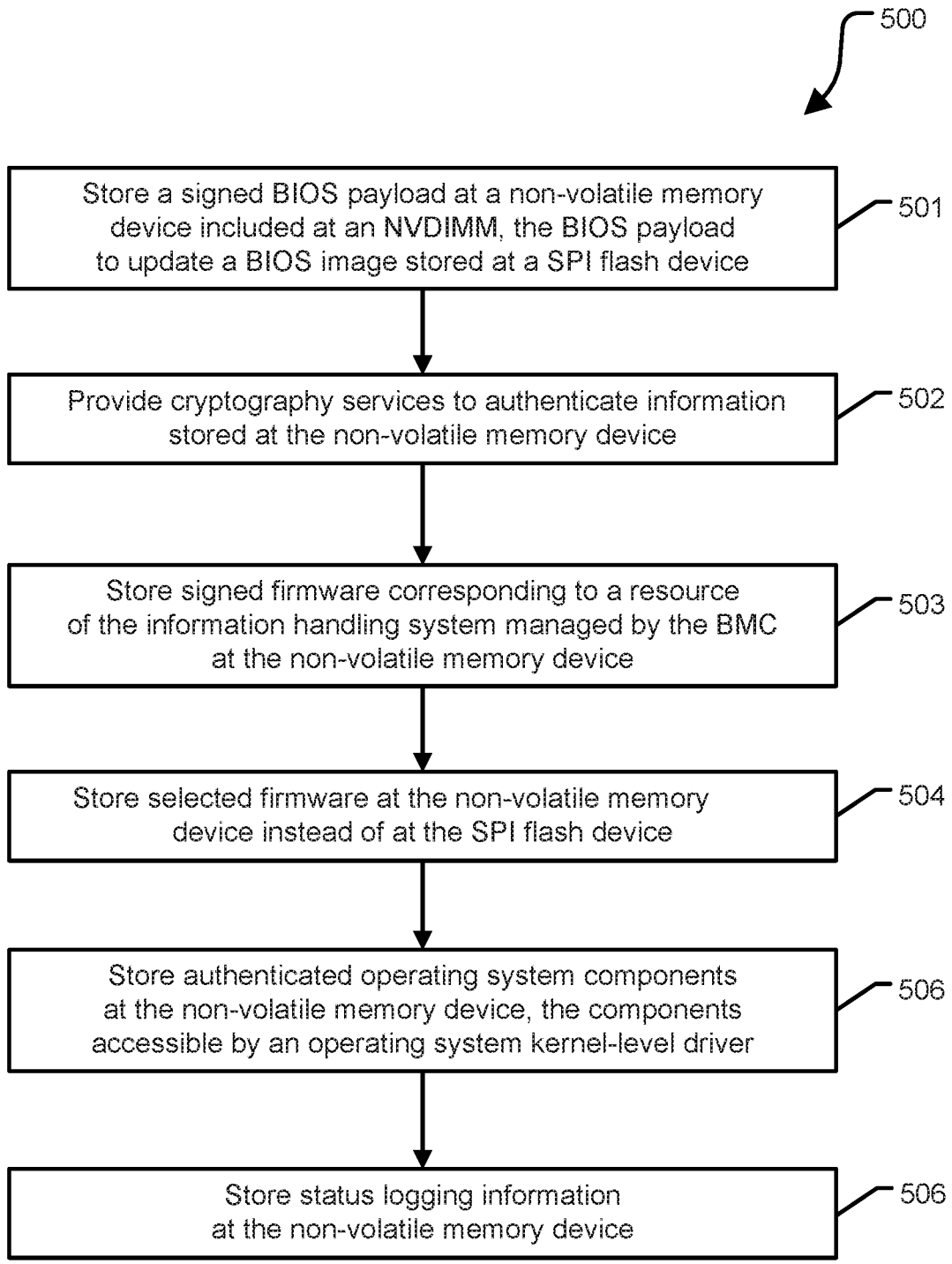
FIG. 5 is a flow diagram illustrating a method for managing information at a non-volatile dual in-line memory module according to a specific embodiment of the present disclosure.

FIG. 5 shows a method 500 for managing information at an NVDIMM according to a specific embodiment of the present disclosure. In particular, method 500 illustrates how BMC 180 can utilize side-band and/or out-of-band communication with non-volatile memory 205 at NVDIMM 105 via high-speed serial bus 182. Method 500 begins at block 501 where a BMC stores a signed BIOS payload at a non-volatile memory device included at an NVDIMM, the BIOS payload available to update a BIOS image stored at an SPI flash device. For example, a duplicate of the primary BIOS image can be stored at the NVDIMM to support BIOS recovery in the event that the primary BIOS image 172 stored at SPI flash device 170 is corrupted. In an embodiment, BIOS 172 can determine that an NVDIMM has been installed at information handling system, and issue a request to BMC 180 to store a copy of the BIOS image to the NVDIMM.

Method 500 continues at block 502 where the BMC provides cryptography services to authenticate information prior to storing the information at a non-volatile memory device included at an NVDIMM. For example, BMC 180 can be used to verify a cryptographic signature associated with a payload or with other encapsulated information prior to the BMC storing the payload at non-volatile memory device included at an NVDIMM. In an embodiment, BMC 180 is configured to provide a root-of-trust at system 100, thereby ensuring secure authentication of the payload. Even if a malicious entity gained access to BMC 180 and serial bus 182, a payload would need to have the correct signing in order to be approved by the EC for storage at non-volatile memory 205. The payload may include a primary BIOS image to be stored at flash device 170 or firmware associated with another device at system 100. For example, the payload may include firmware corresponding to a USB type-C port controller, dock device, and the like.

Method 500 continues at block 503 where a BMC can store signed firmware corresponding to resource of an information handling system managed by the BMC at the non-volatile memory device included at an NVDIMM. For example large signed and authenticated firmware payloads such as a software stack associated with an Intelligent Platform Management Interface. The BMC payloads can be installed at the non-volatile memory device included at an NVDIMM via manageability tools having access to network recourses, making use of cryptographic methods available at BMC 180 to ensure that the payload being installed is trusted. Method 500 continues at block 504 where a BMC can store selected firmware at the non-volatile memory device instead of at the SPI flash device.

Method 500 continues at block 505 where a BMC can store authenticated operating system components at the non-volatile memory device, the components accessible by an operating system kernel-level driver. In an embodiment, the system components can include licensing keys or product enhancements that can be enabled or disabled remotely by a system administrator, for example using remote administration system 210. Method 500 completes at block 506 where a BMC can store error or status information at the non-volatile memory device of an NVDIMM. For example, system error and status information is typically stored at primary SPI flash device 170. By storing the system at NVDIMM 105, additional space is potentially available at flash device 170 and BMC 180 for firmware and other purposes, also eliminating concerns of over-flowing allotted space at flash device. The error or status information can be preserved during system faults. Furthermore, the extensive capacity of non-volatile memory 205 permits the generation of more verbose and useful log records.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a baseboard management controller (BMC);
   a central processing unit (CPU); and
   a non-volatile dual-inline memory module (NVDIMM) including:
      a volatile memory device;
      a non-volatile memory device;
      a double data rate (DDR) interface to provide access to the volatile memory device by the CPU;
      a first serial bus interface to access serial presence detect information; and
      a second serial bus interface to provide side-band and out-of-band data transfer between the non-volatile memory device and the BMC,
   wherein the first serial bus interface and the second serial bus interface are different than the DDR interface.

2. The information handling system of claim 1, wherein the side-band data transfer comprises accessing data stored at the non-volatile memory independently of accesses of the volatile memory device using the DDR interface.

3. The information handling system of claim 1, wherein the out-of-band data transfer comprises accessing data stored at the non-volatile memory device when a DDR memory controller included at the information handling system and coupled to the DDR interface is not operational.

4. The information handling system of claim 1, wherein the BMC is configured to store a signed basic input/output system (BIOS) payload at the non-volatile memory device, the BIOS payload to update a BIOS image stored at a serial peripheral interface flash device included at the information handling system.

5. The information handling system of claim 1, wherein the BMC is configured to provide cryptography services to authenticate information stored at the non-volatile memory device.

6. The information handling system of claim 1, wherein the BMC is configured to store signed firmware corresponding to resource of the information handling system managed by the BMC at the non-volatile memory device.

7. The information handling system of claim 1, wherein the BMC is configured to:
   determine that selected firmware is not to be stored at a serial peripheral interface (SPI) flash device included at the information handling system; and
   store the selected firmware at the non-volatile memory device.

8. The information handling system of claim 1, wherein the BMC is configured to store authenticated operating system components at the non-volatile memory device, the components accessible by an operating system kernel-level driver.

9. The information handling system of claim 1, wherein the BMC is configured to store status log information at the non-volatile memory device.

10. The information handling system of claim 1, wherein the BMC provides a root of trust at the information handling system by authenticating an initial boot block at a serial peripheral interface flash device included at the information handling system.

11. A method comprising:
   providing a double data rate (DDR) interface at a non-volatile dual-inline memory module (NVDIMM), the DDR bus interface for accessing a volatile memory device included at the NVDIMM by a central processing unit included at an information handling system;
   providing a first serial bus interface at the (NVDIMM for accessing serial presence detect information at the NVDIMM; and
   providing a second serial bus interface at the NVDIMM for accessing a non-volatile memory device included at the NVDIMM by a baseboard management controller (BMC) at the information handling system, the second serial bus interface providing side-band and out-of-band data transfer of information between the non-volatile memory device and the BMC,
   wherein the first serial bus interface and the second serial bus interface are different than the DDR interface.

12. The method of claim 11, wherein the side-band data transfer comprises accessing data stored at a non-volatile memory device independently of accesses of the volatile memory device using a double data rate interface.

13. The method of claim 11, wherein the out-of-band data transfer comprises accessing data stored at a non-volatile memory device at the NVDIMM when a double data rate memory controller included at an information handling system and coupled to the double data rate interface at the NVDIMM is not operational.

14. The method of claim 11, wherein the BMC is configured to store a signed basic input/output system (BIOS) payload at a non-volatile memory device at the NVDIMM, the BIOS payload to update a BIOS image stored at a serial peripheral interface flash device included at the information handling system.

15. The method of claim 11, wherein the BMC is configured to provide cryptography services to authenticate information stored at a non-volatile memory device at the NVDIMM.

16. The method of claim 11, wherein the BMC is configured to store signed firmware corresponding to resource of an information handling system managed by the BMC at a non-volatile memory device at the NVDIMM.

17. The method of claim 11, wherein the BMC is configured to:
   determine that selected firmware is not to be stored at a serial peripheral interface flash device included at an information handling system; and
   storing the selected firmware at a non-volatile memory device at the NVDIMM.

18. The method of claim 11, wherein the BMC is configured to store authenticated operating system components at a non-volatile memory device at the NVDIMM, the components accessible by an operating system kernel-level driver.

19. The method of claim 11, wherein the BMC provides a root of trust at an information handling system by authenticating an initial boot block at a serial peripheral interface flash device included at the information handling system.

20. A non-volatile dual-inline memory module comprising:
   a non-volatile memory device;
   a dynamic random access memory device;
   a double data rate interface to access the dynamic random access memory device;
   a first serial bus interface to provide access to serial presence detect information; and
   a second serial bus interface to provide side-band or out-of-band access to the non-volatile memory device by a baseboard management controller,
   wherein the first serial bus interface and the second serial bus interface are different than the double data rate interface.

* * * * *